US006616161B2

(12) United States Patent
Hamada et al.

(10) Patent No.: US 6,616,161 B2
(45) Date of Patent: Sep. 9, 2003

(54) REAR SUSPENSION APPARATUS FOR MOTOR VEHICLE

(75) Inventors: Kenji Hamada, Higashihiroshima (JP); Katsuyuki Komiya, Hatsukaichi (JP); Kenji Tomosada, Higashihiroshima (JP); Toshihide Koyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/219,857

(22) Filed: Aug. 15, 2002

(65) Prior Publication Data

US 2002/0190495 A1 Dec. 19, 2002

Related U.S. Application Data (62) Division of application No. 09/268,016, filed on Mar. 15, 1999.

(30) Foreign Application Priority Data

Mar. 30, 1998 (JP) .......................................... 10-083908

(51) Int. Cl.[7] .............................................. B60G 11/18
(52) U.S. Cl. ......................... 280/124.149; 280/124.166
(58) Field of Search ................................ 280/784, 796, 280/679, 684, 124.111, 124.149, 124.137, 124.166, 124.164, 6.16; 180/309; 296/25, 37.2, 65.09, 37.16, 203.04; 267/273, 274

(56) References Cited

U.S. PATENT DOCUMENTS

| | | | |
|---|---|---|---|
| 2,074,289 A | * | 3/1937 | Wagner ................. 280/124.111 |
| 2,226,047 A | | 8/1940 | Borgward |
| 2,730,355 A | | 1/1956 | Katzung |
| 2,759,740 A | | 1/1956 | McFarland |
| 2,753,190 A | | 4/1956 | Hooven |
| 2,794,652 A | | 7/1957 | Kolbe |
| 2,814,503 A | * | 11/1957 | Porsche et al. ........ 280/124.109 |
| 2,856,201 A | * | 10/1958 | Muller et al. ......... 280/124.149 |
| 3,029,090 A | | 5/1962 | Wilfert et al. |
| 3,194,336 A | | 7/1965 | McHenry |
| 3,195,670 A | * | 7/1965 | Dunn .......................... 180/359 |
| 3,419,100 A | * | 12/1968 | Enke .......................... 180/360 |
| 3,486,575 A | * | 12/1969 | Allison ....................... 180/345 |
| 3,575,441 A | * | 4/1971 | Arning et al. ........ 280/124.107 |
| 4,360,221 A | | 11/1982 | Wagner |
| 4,529,223 A | * | 7/1985 | Maebayashi et al. .... 280/5.521 |
| 4,637,628 A | | 1/1987 | Perkins |
| 5,364,128 A | * | 11/1994 | Ide .............................. 280/784 |
| 5,456,486 A | * | 10/1995 | Lee ..................... 280/124.107 |
| 5,566,969 A | * | 10/1996 | Tattermusch ......... 280/124.117 |

FOREIGN PATENT DOCUMENTS

| | | | | |
|---|---|---|---|---|
| DE | 2 211 331 | | 9/1973 | |
| JP | 57126742 | | 6/1982 | |
| JP | 61249850 A | * | 11/1986 | ............. B60R/5/00 |
| JP | 4-283114 | | 10/1992 | |
| JP | 7-179129 | | 7/1995 | |

* cited by examiner

*Primary Examiner*—Paul N. Dickson
*Assistant Examiner*—Laura B. Rosenberg
(74) *Attorney, Agent, or Firm*—Brooks & Kushman P.C.

(57) ABSTRACT

A rear suspension apparatus for a motor vehicle having a differential gear case (2) disposed between rear right- and left-wheels (1R, 1L), which is of a torsion beam type. In the rear suspension apparatus, a central portion (12a) of a torsion beam (12) for rotatably supporting the rear right- and left-hand wheels (1R, 1L) is curved to run along the configuration of the differential gear case (2), and is disposed at the rear of the differential gear case (2). A suspension damper (16) stretched between the torsion beam (12) and the vehicle body is disposed to be inclined upwardly and forwardly.

18 Claims, 4 Drawing Sheets

REAR SUSPENSION APPARATUS FOR MOTOR VEHICLE

CROSS-REFERENCE TO RELATED APPLICATIONS

This application is a divisional of U.S. application Ser. No. 09/268,016, filed on Mar. 15, 1999.

BACKGROUND OF THE INVENTION

1. Field of the Invention

The present invention relates to a rear suspension apparatus for a motor vehicle.

2. Description of the Related Art

Japanese Patent Laid-Open No. 4-283114 discloses a conventional rear suspension apparatus for a motor vehicle in which, in a rear-wheel-drive vehicle, right- and left-hand trailing arms are connected to each other through a torsion beam extending in vehicle-width directions. In the rear suspension apparatus, while a rear differential gear case for covering a rear differential gear is located between rear right- and left-wheels because of the rear-wheel drive, in order to avoid the interference between the torsion beam and the rear differential gear case, in the aforesaid conventional art, a central portion of the torsion beam in the vehicle-width directions is protrusively curved upwardly, that is, the torsion beam is disposed to bypass the rear differential gear case upwardly.

Furthermore, in the case that a motor vehicle with a considerably short front nose recently called RV (Recreational Vehicle) or SUV (Sports Utility Vehicle) is designed as a rear-wheel-drive vehicle, a torsion beam type rear suspension apparatus is employed to lower a floor panel to the utmost.

On the other hand, for a motor vehicle, it is desired that the floor panel in a rear section of the vehicle body does not lower at collision from its rear side. That is, need exists that various kinds of parts such as a fuel tank placed under the floor panel in the vehicle body rear section do not come into contact with the road surface because of the lowering of the floor panel at the rear side collision. Particularly, in the case of the aforesaid RV, for example, since the distance between the rear wheels and the vehicle body rear end portion is short, there is a high possibility that a large external force works on the rear suspension at the rear side collision, and the external force at the rear side collision can deform the rear wheels upwardly with respect to the vehicle body, which results in a relative fall of the floor panel.

SUMMARY OF THE INVENTION

Accordingly, the present invention has been developed with a view to eliminating the above-mentioned problem, and it is an object of this invention to provide a rear suspension apparatus for a motor vehicle with a torsion beam, which is capable of preventing the fall of the vehicle body during a rear side collision.

For eliminating the foregoing problem and achieving the purpose, according to a first aspect of this invention, in a rear suspension apparatus for a motor vehicle having a differential gear case disposed between rear right- and left-wheels, which rear suspension is of a torsion beam type, a central portion of the torsion beam in a vehicle width direction is bent to extend along a configuration of the differential gear case and is disposed at the rear of the differential gear case, and a suspension damper (absorber) stretched between the torsion beam and a vehicle body is disposed in a state of being inclined or tilted forwardly and upwardly (inclined to take a further forward position in accordance with advancing upwardly).

With the first aspect, when an external force from a rear side works on the torsion beam during a rear side collision, the suspension damper acts as a strut because of being an abrupt external force, and the inclination of the damper causes the torsion beam to shift (be displaced) downwardly, so that the rear wheels relatively move downwardly with respect to the vehicle body, thereby preventing the fall of the vehicle body rear section.

A second aspect is that, in a rear suspension apparatus for a motor vehicle having a differential gear case disposed between rear right- and left-wheels, wherein a central portion of a torsion beam in a width direction of said motor vehicle is bent along a configuration of said differential gear case, and is located at the rear of said differential gear case, and wherein said differential gear case has a curved section protruding rearwardly, and said central portion of said torsion beam is placed at a lower position than a peak portion of said curved section.

With the second aspect, when an external force from a rear side works on the torsion beam at the rear side collision, the torsion beam is brought into contact with the curved section of the rear differential gear case to be guided to shift downwardly, and the rear wheels shift downwardly relative to the vehicle body, which can prevent the fall of the body rear section.

A third aspect is that, in a rear suspension apparatus for a motor vehicle having a differential gear case disposed between rear right- and left-wheels, wherein a central portion of a torsion beam in a width direction of said motor vehicle is bent along a configuration of said differential gear case, and is located at the rear of said differential gear case, and wherein said central portion of said torsion beam is formed to be at a higher position than both end portions thereof in said vehicle width direction.

With the third aspect, when an external force from a rear side is applied to the torsion beam at the rear side collision, owing to the fact that the central portion is formed to be higher than both the end portions in the vehicle width direction, the torsion beam tends to more easily shift downwardly, and the rear wheels shift downwardly relative to the vehicle body, so that the fall of the vehicle body rear section is preventable.

A fourth aspect is that, in a rear suspension apparatus for a motor vehicle having a differential gear case disposed between rear right- and left-wheels, wherein said torsion beam is connected to said vehicle body through a lateral link extending in said vehicle width direction, and said lateral link is disposed to be inclined up and down in said vehicle width direction, with its upper end portion being connected to said vehicle body while its lower end portion being connected to said torsion beam.

With the fourth aspect, when an external force from a rear side acts on the lateral link and the torsion beam, since the lateral link is placed to be tilted up and down in the vehicle width direction, the torsion beam shifts downwardly and the rear wheels shift downwardly relative to the vehicle body, thus preventing the fall of the vehicle body rear section.

A fifth aspect is that, in a rear suspension apparatus for a motor vehicle having a differential gear case disposed between rear right- and left-wheels, wherein an exhaust pipe extending from an engine is bent for bypassing said torsion beam to pass above said torsion beam, and extends to a rear section of said vehicle body, and a portion of said exhaust pipe rearwardly extending from the curved portion is disposed to run from above said torsion beam to below said torsion beam to cross said torsion beam, and is inclined downwardly and rearwardly.

With the fifth aspect, while an external force from a rear side works on a portion of the exhaust pipe rearwardly extending from the bent portion at the rear side collision, since this portion is tilted downwardly and rearwardly, the torsion beam shifts downwardly through the exhaust pipe and the rear wheels shift downwardly relative to the vehicle body, so that the fall of the vehicle body rear section is preventable.

In addition, although the portion of the exhaust pipe rearwardly extending from the bent portion is bent in the vicinity of the bent portion, the deformation by this bending reduces the space between the torsion beam and the bent portion, so that the upward shifting of the torsion beam is more surely preventable.

A sixth aspect is that, in a rear suspension apparatus for a motor vehicle having a differential gear case disposed between rear right- and left-wheels, wherein a central portion of a torsion beam in a width direction of said motor vehicle is bent along a configuration of said differential gear case, and is located at the rear of said differential gear case, and wherein a recessed space formed to a floor panel of said vehicle body and enlarging protrusively and downwardly is placed at the rear of said torsion beam, and the height of a lower end portion of a front wall defining said recessed space is set to exceed the height of an upper end portion of said torsion beam.

With the sixth aspect, although an external force from a rear side presses the recessed space (or the floor panel forming the recessed space) forwardly at the rear side collision, since the height of the lower end portion of the front wall defining the recessed space is set to exceed the upper end portion of the torsion beam, the recessed space allows the torsion beam to shift downwardly so that the rear wheels shift downwardly relative to the vehicle body to prevent the fall of the vehicle body rear section.

A seventh aspect is that, in the motor vehicle rear suspension apparatus employing the sixth aspect, the front wall extends at least from above the torsion beam to under the torsion beam, and is inclined downwardly and rearwardly.

With the seventh aspect, since the front wall is formed to be tilted downwardly and rearwardly, a stronger operation to shift the torsion beam downwardly takes place, so that the effects of the sixth aspect are more certainly obtainable.

An eighth aspect is that, in the motor vehicle rear suspension apparatus employing the sixth aspect, the lateral link is placed between the front wall and the torsion beam.

With the eighth aspect, the operation of the lateral link in the sixth aspect can more certainly produce the effects of the sixth or seventh aspect.

Other objects and advantages besides those discussed above shall be apparent to those skilled in the art from the description of a preferred embodiment of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENT

Figure 1:
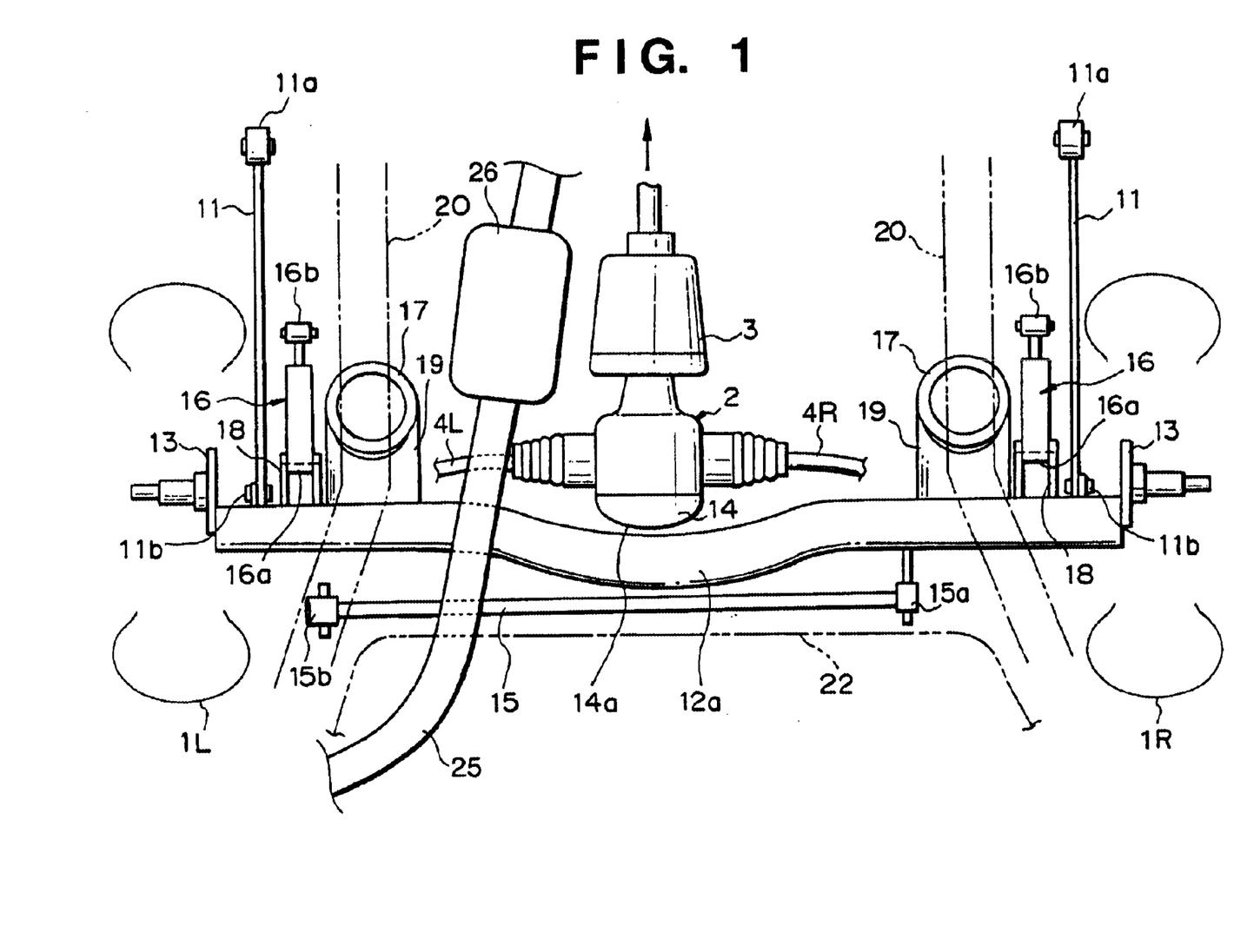
FIG. 1 is a plan view showing a suspension apparatus for a motor vehicle according to an embodiment of the present invention.

FIG. 1 shows a rear suspension apparatus for a motor vehicle such as an RV according to an embodiment, where reference mark 1R represents a rear right-hand wheel and reference mark 1L denotes a rear left-hand wheel. Designated at numeral 2 is a rear differential gear case containing a rear differential gear for differentially distributing a drive force to the rear right- and left-hand wheels 1R and 1L. Further, in front of the rear differential gear case 2 in forward and backward directions of a vehicle body, there is disposed a center differential case 3 housing a center differential mechanism for differentially distributing a drive force between front and rear wheels. A drive force from an engine (not shown) placed at a front section of a motor vehicle is transferred from the center differential case (gear) 3 and the rear differential gear case (gear) 2 through right- and left-hand drive shafts 4R, 4L to the rear right- and left-hand wheels 1R, 1L. In this embodiment, the motor vehicle is a four-wheel drive car.

The suspension apparatus for the rear right- and left-hand wheels is equipped with a pair of right- and left-hand trailing arms 11 serving as suspension arm members (suspension components). Each of the trailing arms 11 substantially extend horizontally in the vehicle body forward and backward directions, and its front end portion 11a is supported by the vehicle body to be rotatable about an axis running in the vehicle width direction so that the trailing arm 11 can freely swing up and down.

Each of rear end portions 11b of the pair of right- and left-hand trailing arms 11 is rotatably supported by a torsion beam 12 extending lengthwise in the vehicle width direction. To both end portions of the torsion beam 12, there are fixed wheel supporting members 13 for rotatably holding the rear right- and left-hand wheels 1R, 1L. Incidentally, it is also appropriate that the rear end portion 11b of the trailing arm 11 is pivotally coupled directly to the wheel supporting member 13. The torsion beam 12 is located to bypass the rear differential gear case 2 to pass behind it in the vehicle body forward and backward direction.

The torsion beam 12 is made of a material having a sufficient rigidity and formed to have a diameter providing a sufficient rigidity, and its central portion 12a positioned just at the rear of the rear differential gear case 2 is bent or curved rearwardly and upwardly in order to avoid the interference with the rear differential gear case 2 and further to prevent a fall of a floor at a rear side collision. The torsion beam 12 runs substantially straight from this central portion 12a up to both end portions in the vehicle width directions (see FIGS. 2 to 5).

Figure 2:
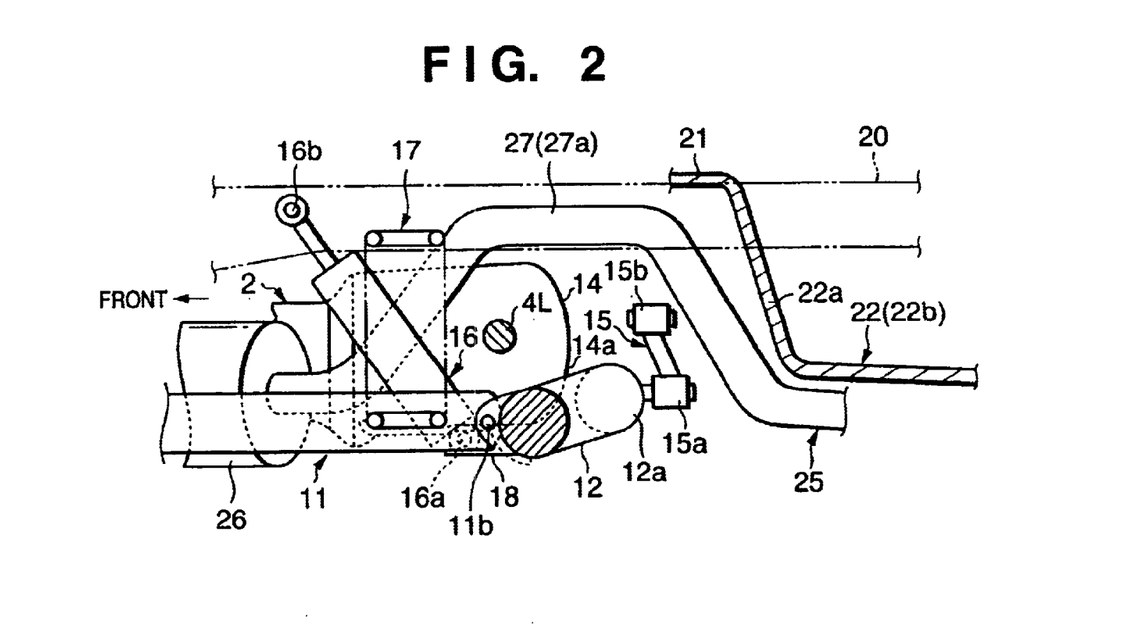
FIGS. 2 to 5 are side elevational views showing the suspension apparatus where a portion is omitted from FIG.
Figure 3:
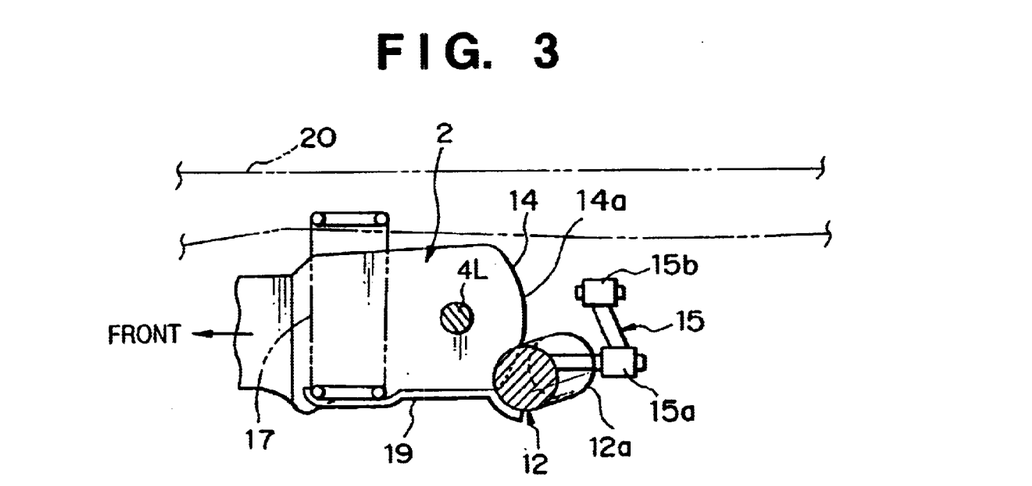
Figure 4:
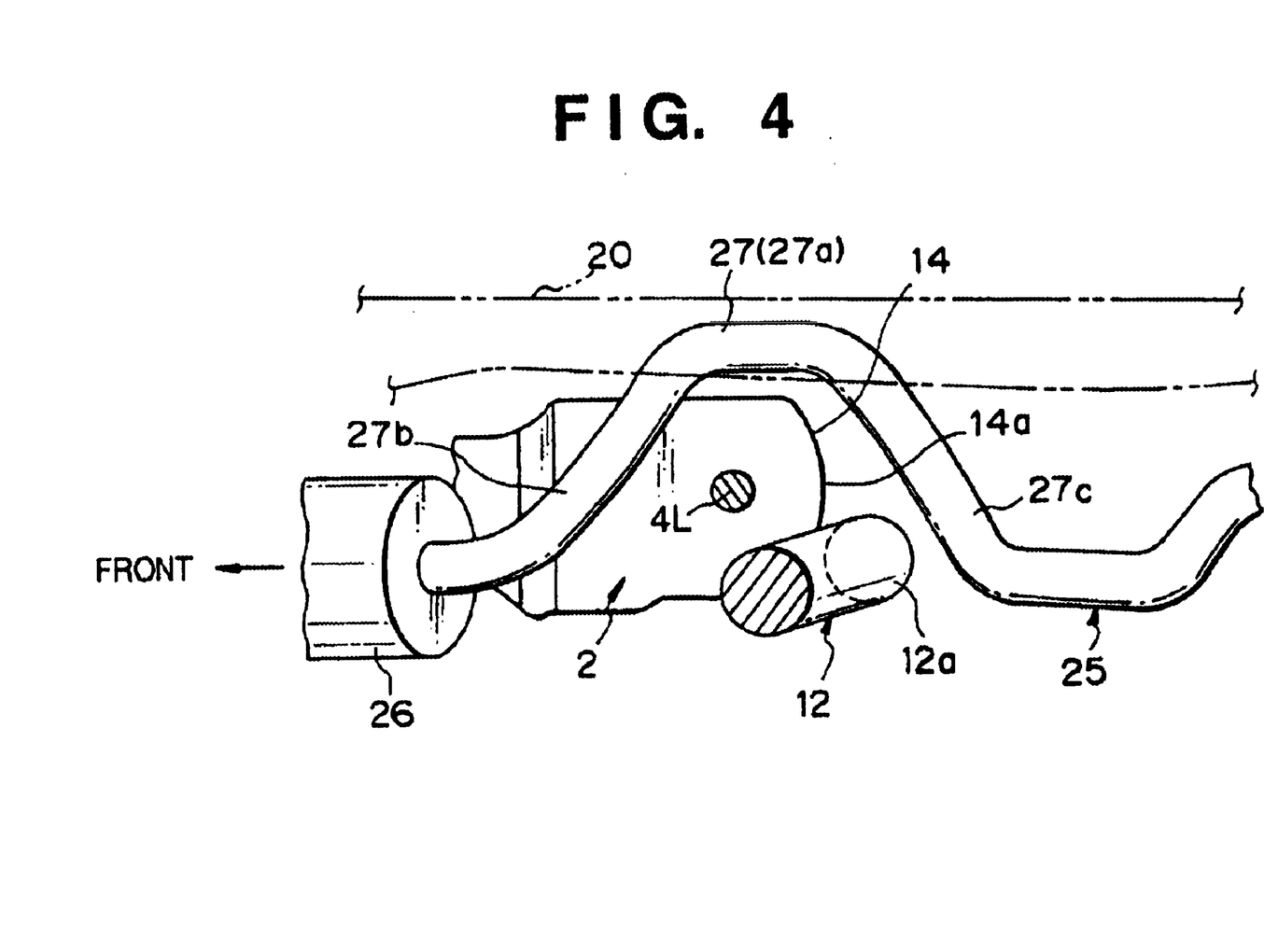

The central portion 12a of the torsion beam 12 is bent to run along an external shape of the rear differential gear case 2 and disposed at the rear of the rear differential gear case 2, and further, curved upwardly to be at a position slightly lower than the vertical center position of the rear differential gear case 2 (see FIGS. 2 to 4).

As shown in FIGS. 2 to 4, the rear section of the rear differential gear case 2 confronting the central portion 12a of the torsion beam has a curved portion 14 protruding rearwardly, and this curved section 14 has a peak portion 14a whose substantial center position in vertical directions projects most rearwardly when viewed from a side. That is, the portion of this curved section 14, from the upper portion to the peak portion 14a, protrudes smoothly and rearwardly, while the portion thereof from the peak portion 14a to the lower portion is curved smoothly and forwardly.

Figure 5:
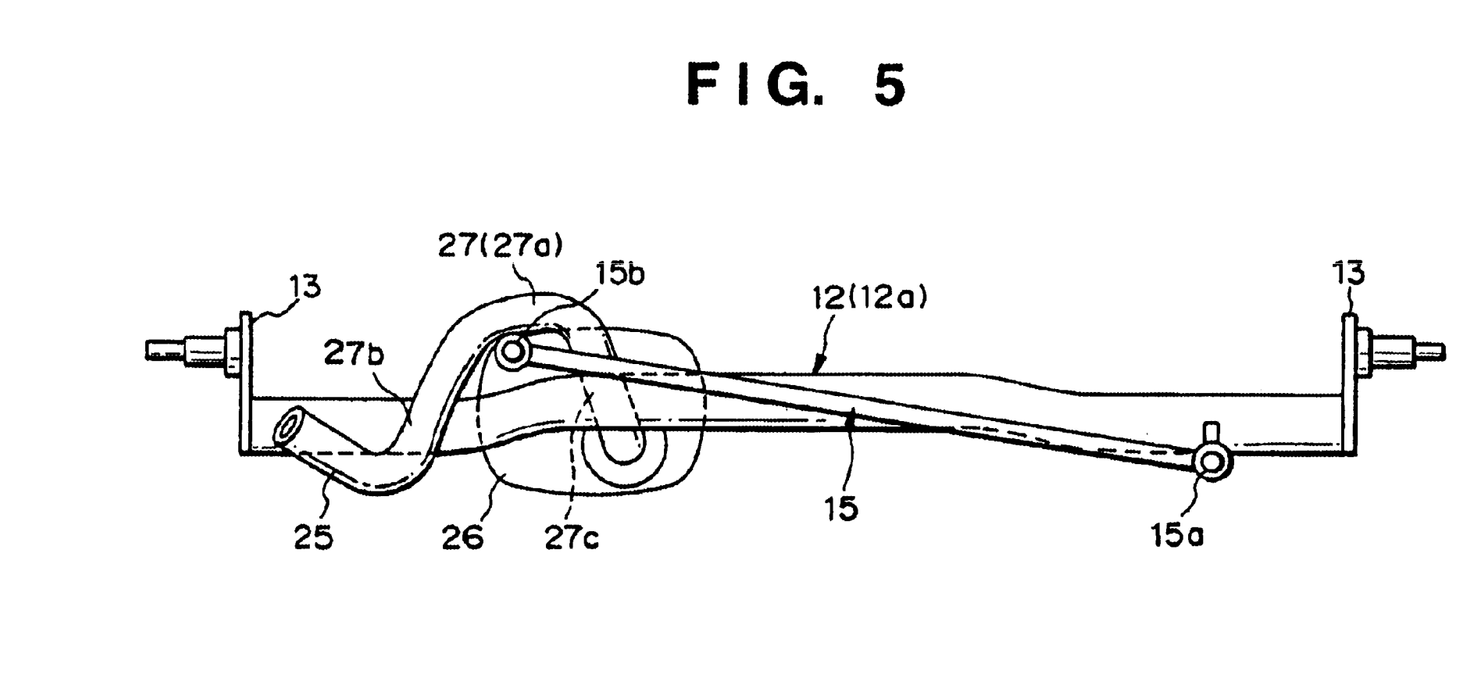

At the rear of the torsion beam 12, there is disposed a lateral link 15 extending in the vehicle width directions. As shown in FIG. 5, this lateral link 15 is mounted such that its one end portion and its other end portion are offset vertically to be tilted, and its lower end portion 15a is connected to the torsion beam 12 while its upper end portion 15b is coupled to the vehicle body. The connecting portions of the upper and lower end portions 15b, 15a of the lateral link 15 is supported so that the lateral link 15 can swing in a state where its rotation axis is taken in a vehicle body forward and backward direction.

To the torsion beam 12, in the vicinity of both the end portions thereof in the vehicle width direction, there are connected a pair of right- and left-hand suspension dampers 16 and a pair of right- and left-hand suspension springs (in this embodiment, coil springs) 17. That is, to the torsion beam 12, in the vicinity of each of the trailing arms 11, a damper bracket 18 is fixedly located and a spring sheet 19 is fixedly placed at a slightly inside position in the vehicle width direction with respect to the damper bracket 18. In the damper bracket 18, a lower end portion 16a of the damper 16 is supported to be allowed to freely swing in a state where its rotation axis coincides with a vehicle width direction, and an upper end portion 16b of the damper 16 is supported to be allowed to freely swing with respect to a floor frame 20, so that the damper 16 can freely swing up and down. In addition, the damper 16 is disposed to be tilted forwardly from the lower end portion 16a to the upper end portion 16b (see FIG. 2).

A lower end portion of the coil spring 17 is placed in the spring sheet 19, while an upper end portion of the spring 17 is brought into contact with the floor frame 20 (see FIG. 3).

As shown in detail in FIG. 2, a floor panel 21 in the vehicle body rear section is largely expanded protrusively and downwardly from behind the lateral link 15 to define a recessed space 22. This recessed space 22 is formed to run in a vehicle width direction, and formed so that the whole assumes a rectangular configuration when viewed from the above. For example, in the case of a triplex-row-seat car, when the third row seat is removed, the seat can be accommodated (accommodated in a state where a seat cushion and a seat back are stacked in a substantially horizontal condition). This recessed space 22 is changeable in size and shape to accept a spare tire.

A front wall 22a defining the recessed space 22 is gradually tilted rearwardly while extending downwardly, while a bottom wall 22b extends in a substantially horizontal direction to form a generally flat surface. The height of the front wall 22a (the depth of the recessed space) is set to substantially equal the central portion 12a of the torsion beam 12. In addition, the height of the bottom wall 22b is preferably set to be higher than the height of the center position of the height dimension of the vertical curving of the central portion 12a of the torsion beam 12, which can prevent a fall of the floor at a rear side collision which will be mentioned herein later.

The torsion beam 12, the lateral link 15, a rear portion 27c of an exhaust pipe 25 and the recessed space 22 are disposed in order at the rear of the rear differential gear case 2.

In FIG. 5, numeral 25 signifies an exhaust pipe extending from an engine, and a connection of a muffler 26 to this exhaust pipe 25 is made on a side of the center differential case 3 and in front of the rear differential gear case 2. The exhaust pipe 25 existing at the rear of the muffler 26 is formed curvedly to bypass the torsion beam 12 to pass above it. That is, in the exhaust pipe 25, its curved portion 27 curved to bypass the torsion beam 12 comprises three portions 27a to 27c. The portion 27a is an intermediate portion located above the torsion beam 12 and extending substantially straight in the forward and backward direction, the portion 27b is a front portion extending from the intermediate portion 27a to gradually lower forwardly, and the portion 27c is a rear portion extending from the intermediate portion 27a to gradually lower rearwardly.

Secondly, referring to FIGS. 1 to 5, a description will be made hereinbelow of a behavior of the torsion beam 12, that is, the rear right- and left-hand wheels 1R, 1L, during a rear side collision.

During a rear side collision, the vehicle body deforms by receiving an external force from a rear side, and the front wall 22a of the recessed space 22 shifts forwardly. When the torsion beam 12 receives a strong external force in the forward direction by being pressed by the front wall 22a, because of the abrupt external force, the damping force of the damper 16 increases and operates like a strut, and owing to the inclination of the damper 16, the torsion beam 12 is forcedly shifted downwardly. In other words, the rear wheels 1R, 1L are shifted downwardly to limit the fall of the vehicle body rear section.

Even if the lower end portion 16a of the damper 16 tries to shift forwardly, since the damper 16 swings about its upper end portion 16b, the damper 16 becomes longer vertically, which acts to make the torsion beam 12 shift downwardly.

Furthermore, since the curved section 14 of the rear differential gear case 2 stands in opposed relation immediately before the torsion beam 12, the torsion beam 12 trying to shift forwardly is guided by the curved surface lower in position than the peak portion 14a of the curved section 14 to shift downwardly, thereby limiting the fall of the vehicle body rear section.

Still further, both the end portions of the torsion beam 12 in the vehicle width directions are at lower positions than the central portion 12a, and hence, when the central portion 12a being at the rearmost position tries to shift forwardly, the torsion beam 12 generates component forces for shifting both its end portions downwardly, and consequently, the torsion beam 12 shifts downwardly as a whole, thus limiting the fall of the vehicle body rear section.

Looking at the lateral link 15, as easily understood from FIG. 5, the forward or upward (also, forward and upward) shifting of the torsion beam 12 shows a motion to shorten the length of the lateral link 15, and the lateral link 15 acts as a strut. On the contrary, the downward (forward and downward) shifting of the torsion beam 12 takes a motion whereby the lateral link 15 smoothly swings with its upper end portion (a portion rotatably supported with respect to the vehicle body) being taken as a rotating center.

As described above, the operation of the lateral link 15 makes the torsion beam 12 easily shift downwardly, thus limiting the fall of the vehicle body rear section.

At the rear side collision, of the curved portion 27 of the exhaust pipe 25 bypassing the torsion beam 12, the rear portion 27c placed at the rear of the torsion beam 12 guides the torsion beam 12 downwardly by its inclination, thus limiting the fall of the vehicle body rear section. In addition, although the rear portion 27c is deformed so that the connecting portion with the intermediate portion 27a is bent, this deformation reduces the space necessary for the upward shifting of the torsion beam 12.

At the rear side collision, the recessed space 22 assuming a large volume protrusively comes above the torsion beam 12 to limit the upward shifting of the torsion beam 12. Moreover, due to the inclination of the front wall 22a of the recessed space 22, the torsion beam 12 is pressed forwardly by the front wall 22a to be shifted downwardly.

Although the embodiment has been described above, the motor vehicle can be not only a four-wheel-drive car but also a rear-wheel-drive car. Further, it is possible to properly select the body configuration of the motor vehicle such as a general passenger car having a trunk compartment at its vehicle body rear section.

The present invention is not limited to the above embodiments and various changes and modifications can be made within the spirit and scope of the present invention. Therefore, to apprise the public of the scope of the present invention the following claims are made.

What is claimed is:

1. A torsion beam type rear suspension apparatus for a motor vehicle having a differential gear case disposed between rear right and left wheels, the apparatus comprising:
    a torsion beam, having a central portion in a vehicle width direction, which is bent along a configuration of the differential gear case so as to position the central portion at the rear of the differential gear case, the central portion of the torsion beam movable to the differential gear case;
    a pair of wheel support members connected to right and left end portions of the torsion beam in the vehicle width direction for the torsion beam to rotatably hold the rear right and left wheels;
    a pair of trailing arms disposed at right and left sides of the vehicle width direction and extending in a vehicle length direction, each front end portion of the trailing arms connected to a vehicle body so as to be rotatable about an axis running along the vehicle width direction, and each rear end portion of the trailing arms connected to the torsion beam so as to be rotatable about an axis running along the vehicle width direction; and
    a lateral link extending in the vehicle width direction, one end portion of the lateral link connected to the vehicle body at one side of the vehicle width direction so as to be rotatable about an axis running along the vehicle length direction, and the other end portion of the lateral link connected to the torsion beam at the other side of the vehicle width direction so as to be rotatable about an axis running along the vehicle length direction;
    wherein the differential gear case has a curved section protruding rearwardly along the vehicle length direction, a peak portion of the curved section is placed at a more rearward position than an upper edge portion and a lower edge portion of the curved section, and is formed to be substantially center of the rear end portion of the differential gear case, and the central portion of the torsion beam is formed to be at a higher position than both end portions of the torsion beam and is disposed to be at a lower position than the peak portion of the curved section of the rear end portion of the differential gear case, whereby the torsion beam is contacted to the differential gear case and then moved downwardly along the curved section during a rear end collision.

2. The torsion beam type rear suspension apparatus of claim 1 further comprising:
    a suspension damper placed between the torsion beam and a body member of the motor vehicle, and being inclined upwardly and forwardly;
    wherein an upper end portion of the damper is connected to the body member of the motor vehicle and a lower end portion of the damper is connected to the torsion beam, whereby the damper adds a downward load to the torsion beam by contacting the torsion beam during the rear end collision.

3. The torsion beam type rear suspension apparatus of claim 2 wherein:
    the lateral link is disposed at a rear of the torsion beam;
    wherein both end portions of the lateral link are offset vertically and the lower end portion of the lateral link is connected to the torsion beam and the upper end portion of the lateral link is connected to the body member, whereby the lateral link adds a downward load to the torsion beam by contacting the torsion beam during the rear end collision.

4. The torsion beam type rear suspension apparatus of claim 1 wherein:
    the lateral link is disposed at a rear of the torsion beam;
    wherein both end portions of the lateral link are offset vertically and the lower end portion of the lateral link is connected to the torsion beam and the upper end portion of the lateral link is connected to the body member, whereby the lateral link adds a downward load to the torsion beam by contacting the torsion beam during the rear end collision.

5. The torsion beam type rear suspension apparatus of claim 1 further comprising:
    an exhaust pipe extending from an engine to a rear section of the vehicle body and having a curved portion bent for bypassing the torsion beam to pass above the torsion beam;
    wherein a lower end portion of the curved portion of the exhaust pipe extends to a portion where the torsion beam and the curved portion are overlapped at a rear of the torsion beam in the vehicle body forward and backward direction, and an upper end portion of the curved portion of the exhaust pipe is disposed forward of the lower end portion of the curved portion in the vehicle body forward and backward direction, and is inclined downwardly and rearwardly, whereby the exhaust pipe adds a downward load to the torsion beam by contacting the torsion beam during the rear end collision.

6. The torsion beam type rear suspension apparatus of claim 1 further comprising:
    a recessed space formed to a floor panel of the vehicle body, enlarging protrusively and downwardly and being placed at the rear of the torsion beam;
    wherein a lower portion of a front wall defining the recessed space is disposed upwardly with respect to the upper end portion of the torsion beam, whereby the recessed space moves above the torsion beam so as to prevent the torsion beam from shifting upward during the rear end collision.

7. The torsion beam type rear suspension apparatus of claim 1 further comprising:
    a recessed space formed to a floor panel of the vehicle body, enlarging protrusively and downwardly and being placed at the rear of the torsion beam;
    wherein a front wall of the recessed space is inclined downwardly and rearwardly, an upper end portion of the front wall is disposed forward of a lower end portion of the front wall, whereby the front wall of the recessed space adds a downward load to the torsion beam by contacting the torsion beam during the rear end collision.

8. A torsion beam type rear suspension apparatus for a motor vehicle having a differential gear case disposed between rear right and left wheels, the apparatus comprising:

a torsion beam, having a central portion in a vehicle width direction, which is bent along a configuration of the differential gear case so as to position the central portion at the rear of the differential gear case, the central portion being disposed at a lower position than a vertical center of the rear end portion of the differential gear case; and a recessed space formed to a floor panel of the vehicle body, enlarging protrusively and downwardly and being placed at the rear of the torsion beam;

wherein the differential gear case has a curved section protruding rearwardly, a peak portion of the curved section is placed at a more rearward position than an upper edge portion and a lower edge portion of the curved section, and the central portion of the torsion beam is formed to be at a higher position than both end portions of the torsion beam, whereby the torsion beam is moved downwardly along the curved section during a rear end collision; and wherein a lower portion of a front wall defining the recessed space is disposed upwardly with respect to the upper end portion of the torsion beam, whereby the recessed space moves above the torsion beam so as to prevent the torsion beam from shifting upward during the rear end collision.

9. The torsion beam type rear suspension apparatus of claim 8 further comprising:

a suspension damper placed between the torsion beam and a body member of the motor vehicle, and being inclined upwardly and forwardly;

wherein an upper end portion of the damper is connected to the body member of the motor vehicle and a lower end portion of the damper is connected to the torsion beam, whereby the damper adds a downward load to the torsion beam by contacting the torsion beam during the rear end collision.

10. The torsion beam type rear suspension apparatus of claim 9 further comprising:

a lateral link disposed at a rear of the torsion beam and extending in the vehicle width direction;

wherein both end portions of the lateral link are offset vertically and the lower end portion of the lateral link is connected to the torsion beam and the upper end portion of the lateral link is connected to the body member, whereby the lateral link adds a downward load to the torsion beam by contacting the torsion beam during the rear end collision.

11. The torsion beam type rear suspension apparatus of claim 8 further comprising:

a lateral link disposed at a rear of the torsion beam and extending in the vehicle width direction;

wherein both end portions of the lateral link are offset vertically and the lower end portion of the lateral link is connected to the torsion beam and the upper end portion of the lateral link is connected to a body member of the motor vehicle, whereby the lateral link adds a downward load to the torsion beam by contacting the torsion beam during the rear end collision.

12. The torsion beam type rear suspension apparatus of claim 8 further comprising:

an exhaust pipe extending from an engine to a rear section of the vehicle body and having a curved portion bent for bypassing the torsion beam to pass above the torsion beam;

wherein a lower end portion of the curved portion of the exhaust pipe extends to a portion where the torsion beam and the curved portion are overlapped at a rear of the torsion beam in the vehicle body forward and backward direction, and an upper end portion of the curved portion of the exhaust pipe is disposed forward of the lower end portion of the curved portion in the vehicle body forward and backward direction, and is inclined downwardly and rearwardly, whereby the exhaust pipe adds a downward load to the torsion beam by contacting the torsion beam during the rear end collision.

13. The torsion beam type rear suspension apparatus of claim 8 further comprising:

wherein a front wall of the recessed space is inclined downwardly and rearwardly, an upper end portion of the front wall is disposed forward of a lower end portion of the front wall, whereby the front wall of the recessed space adds a downward load to the torsion beam by contacting the torsion beam during the rear end collision.

14. A torsion beam type rear suspension apparatus for a motor vehicle having a differential gear case disposed between rear right and left wheels, the apparatus comprising:

a torsion beam, having a central portion in a vehicle width direction, which is bent along a configuration of the differential gear case so as to position the central portion at the rear of the differential gear case, the central portion being disposed at a lower position than a vertical center of the rear end portion of the differential gear case; and a recessed space formed to a floor panel of the vehicle body, enlarging protrusively and downwardly and being placed at the rear of the torsion beam;

wherein the differential gear case has a curved section protruding rearwardly, a peak portion of the curved section is placed at a more rearward position than an upper edge portion and a lower edge portion of the curved section, and the central portion of the torsion beam is formed to be at a higher position than both end portions of the torsion beam, whereby the torsion beam is moved downwardly along the curved section during a rear end collision; and wherein a front wall of the recessed space is inclined downwardly and rearwardly, an upper end portion of the front wall is disposed forward of a lower end portion of the front wall, whereby the front wall of the recessed space adds a downward load to the torsion beam by contacting the torsion beam during the rear end collision.

15. The torsion beam type rear suspension apparatus of claim 14 further comprising:

a suspension damper placed between the torsion beam and a body member of the motor vehicle, and being inclined upwardly and forwardly;

wherein an upper end portion of the damper is connected to the body member of the motor vehicle and a lower end portion of the damper is connected to the torsion beam, whereby the damper adds a downward load to the torsion beam by contacting the torsion beam during the rear end collision.

16. The torsion beam type rear suspension apparatus of claim 15 further comprising:

a lateral link disposed at a rear of the torsion beam and extending in the vehicle width direction;

wherein both end portions of the lateral link are offset vertically and the lower end portion of the lateral link is connected to the torsion beam and the upper end portion of the lateral link is connected to the body member, whereby the lateral link adds a downward load to the torsion beam by contacting the torsion beam during the rear end collision.

17. The torsion beam type rear suspension apparatus of claim 14 further comprising:

a lateral link disposed at a rear of the torsion beam and extending in the vehicle width direction;

wherein both end portions of the lateral link are offset vertically and the lower end portion of the lateral link is connected to the torsion beam and the upper end portion of the lateral link is connected to a body member of the motor vehicle, whereby the lateral link adds a downward load to the torsion beam by contacting the torsion beam during the rear end collision.

18. The torsion beam type rear suspension apparatus of claim 14 further comprising:

an exhaust pipe extending from an engine to a rear section of the vehicle body and having a curved portion bent for bypassing the torsion beam to pass above the torsion beam;

wherein a lower end portion of the curved portion of the exhaust pipe extends to a portion where the torsion beam and the curved portion are overlapped at a rear of the torsion beam in the vehicle body forward and backward direction, and an upper end portion of the curved portion of the exhaust pipe is disposed forward of the lower end portion of the curved portion in the vehicle body forward and backward direction, and is inclined downwardly and rearwardly, whereby the exhaust pipe adds a downward load to the torsion beam by contacting the torsion beam during the rear end collision.

* * * * *